(12) United States Patent
Frodsham et al.

(10) Patent No.: US 8,195,996 B2
(45) Date of Patent: Jun. 5, 2012

(54) APPARATUSES, SYSTEMS AND METHODS FOR DETECTING ERRORS IN DATA STREAMS ON POINT-TO-POINT SERIAL LINKS

(75) Inventors: Timothy Frodsham, Portland, OR (US); Zale T. Schoenborn, Portland, OR (US); Sanjay Dabral, Pala Alto, CA (US); Murateendhara Navada, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1066 days.

(21) Appl. No.: 12/115,360

(22) Filed: May 5, 2008

(65) Prior Publication Data

US 2008/0209306 A1 Aug. 28, 2008

Related U.S. Application Data

(62) Division of application No. 11/323,111, filed on Dec. 30, 2005, now Pat. No. 7,617,424.

(51) Int. Cl.
*G01R 31/28* (2006.01)
*G06F 11/00* (2006.01)
(52) U.S. Cl. ........................... 714/736; 714/704
(58) Field of Classification Search .................. 714/736, 714/789, 704, 769
See application file for complete search history.

(56) References Cited

U.S. PATENT DOCUMENTS

| 6,973,602 | B1 | 12/2005 | Fung et al. | |
|---|---|---|---|---|
| 6,988,227 | B1 * | 1/2006 | Perrott | 714/704 |
| 7,062,687 | B1 | 6/2006 | Gfeller et al. | |
| 7,231,558 | B2 | 6/2007 | Gentieu et al. | |
| 7,246,274 | B2 | 7/2007 | Kizer et al. | |
| 7,386,767 | B1 | 6/2008 | Xue et al. | |
| 7,571,360 | B1 * | 8/2009 | Lewicki et al. | 714/704 |
| 7,668,274 | B2 * | 2/2010 | Millman et al. | 375/355 |
| 7,904,771 | B2 * | 3/2011 | Mochizuki | 714/724 |

OTHER PUBLICATIONS

Office Action for U.S. Appl. No. 11/323,111, mailed Aug. 7, 2008, 6 pgs.

* cited by examiner

*Primary Examiner* — Phung M Chung
(74) *Attorney, Agent, or Firm* — Blakely, Sokoloff, Taylor & Zafman LLP

(57) ABSTRACT

Methods, apparatuses and systems for physical link error data capture and analysis. A receiver is coupled to receive a data stream via a point-to-point serial link. A control circuit is coupled with the receiver to cause the receiver to selectively sample the data stream according to an offset parameter and an interval parameter. Comparison circuitry compares the data stream sample to expected data values to determine a bit error rate.

11 Claims, 6 Drawing Sheets

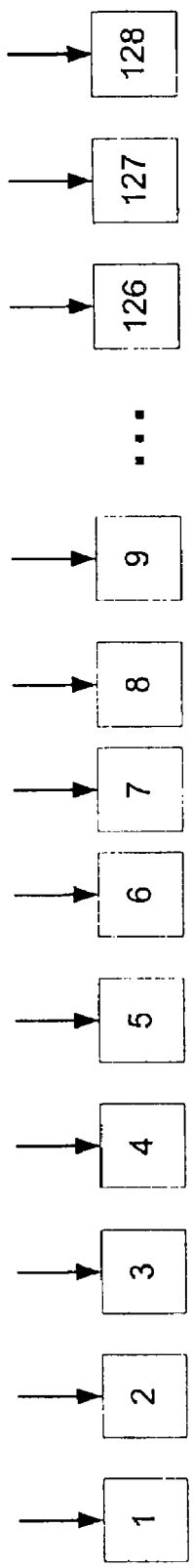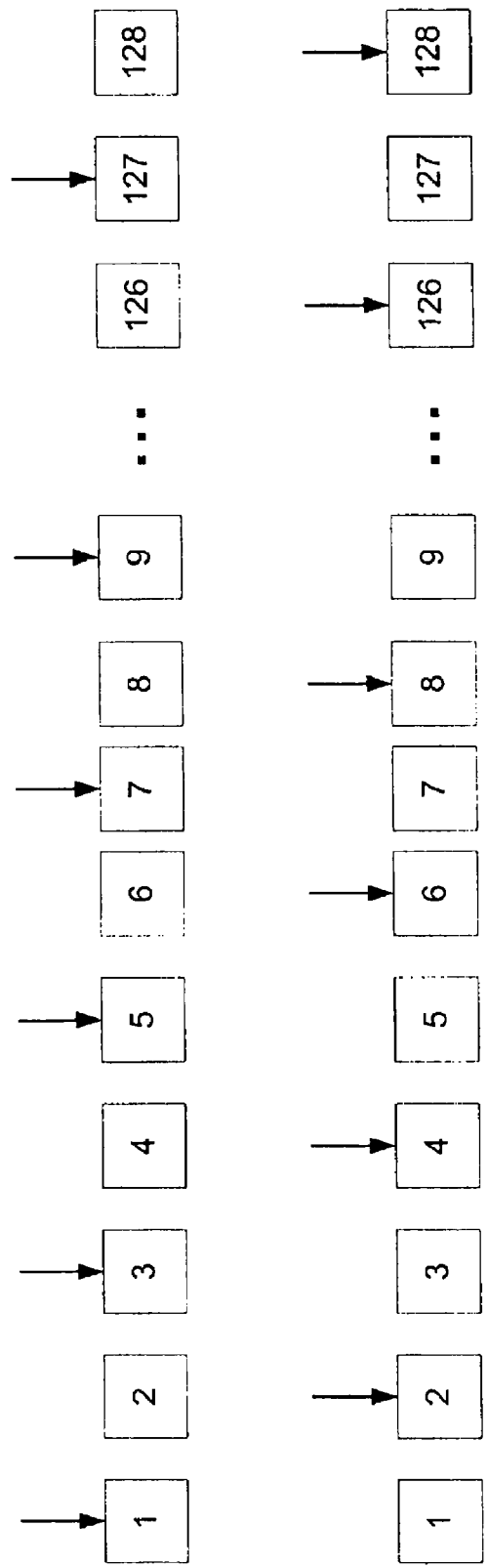

US 8,195,996 B2

APPARATUSES, SYSTEMS AND METHODS FOR DETECTING ERRORS IN DATA STREAMS ON POINT-TO-POINT SERIAL LINKS

RELATED APPLICATION

This application is a divisional application of U.S. patent application Ser. No. 11/323,111 filed Dec. 30, 2005 now U.S. Pat. No. 7,617,424.

TECHNICAL FIELD

Embodiments of the invention relate to a physical layer interface of a computing system. More particularly, embodiments of the invention relate to error monitoring for serial links between components of a computing system.

BACKGROUND

In computing systems, as operating frequencies increase external testing of physical links becomes increasingly difficult. Some physical link specifications incorporate self-test hooks that can be used to collect, for example, eye diagrams, equivalent time oscilloscope traces and/or bit error rate diagrams. However, these self-test hooks may be sufficiently inflexible, which may result in a complex and/or time consuming testing and debugging process.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 4a is a conceptual illustration of error checking using a single register for each bit of an incoming data stream.

FIG. 4b is a conceptual illustration of error checking using two registers for alternating bits of an incoming data stream to be stored in respective registers.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

In one embodiment, pattern generation and comparison may be utilized for error checking purposes. As described in greater detail below, flexibility in the error checking functionality may be provided to enable targeted, hardware specific testing and generic tools such as an "on-die oscilloscope."

Programmable offsets and intervals in the error checking mechanism may allow support of targeted tests and on-die oscilloscope functionality.

In order to adequately characterize error rates on a high-speed serial link, measurements may be taken over a range of frequencies, timing and/or voltage stress factors. At the high end of frequency and stress, large counters may be required to measure the expected error rate. At the low end of frequency and stress, smaller counters may be used because the error rate may be lower. However, simply utilizing large counters to support a full range of testing may be relatively expensive in terms of circuit size and/or power consumption.

As described in greater detail below, in one embodiment, individual counters may be used for individual data lanes. Multiple individual counters may be multiplexed to provide an extended counter for a selected data lane. This extended error counting functionality may allow flexibility to characterize high bit error rates for a selected data lane.

Figure 1:
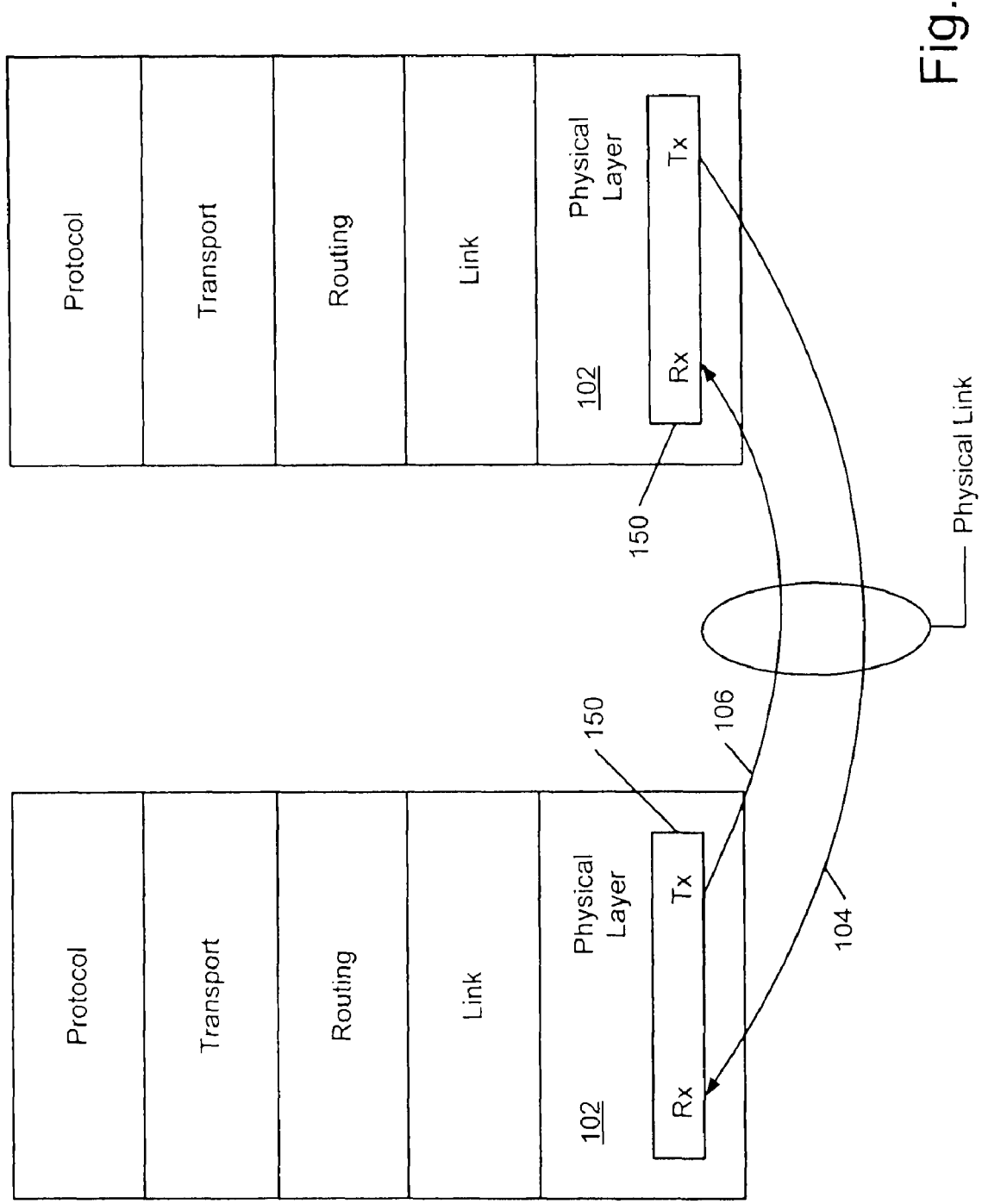
FIG. 1 is a block diagram of one embodiment of an apparatus for a physical interconnect.

FIG. 1 is a block diagram of one embodiment of an apparatus for a physical interconnect. In one aspect, the apparatus depicts a physical layer for a cache-coherent, link-based interconnect scheme for a processor, chipset, and/or IO bridge components. For example, the physical interconnect may be performed by each physical layer of an integrated device. The physical interconnect may support training and testing in association with use of an oscilloscope probe or other test equipment to monitor the physical interconnect.

Specifically, the physical layer may provide communication between two ports over a physical interconnect comprising two uni-directional links. Specifically, one uni-directional link 104 from a first transmit port 150 of a first integrated device to a first receiver port 150 of a second integrated device. Likewise, a second uni-directional link 106 from a first transmit port 150 of the second integrated device to a first receiver port 150 of the first integrated device. However, the claimed subject matter is not limited to two uni-directional links.

Figure 2:
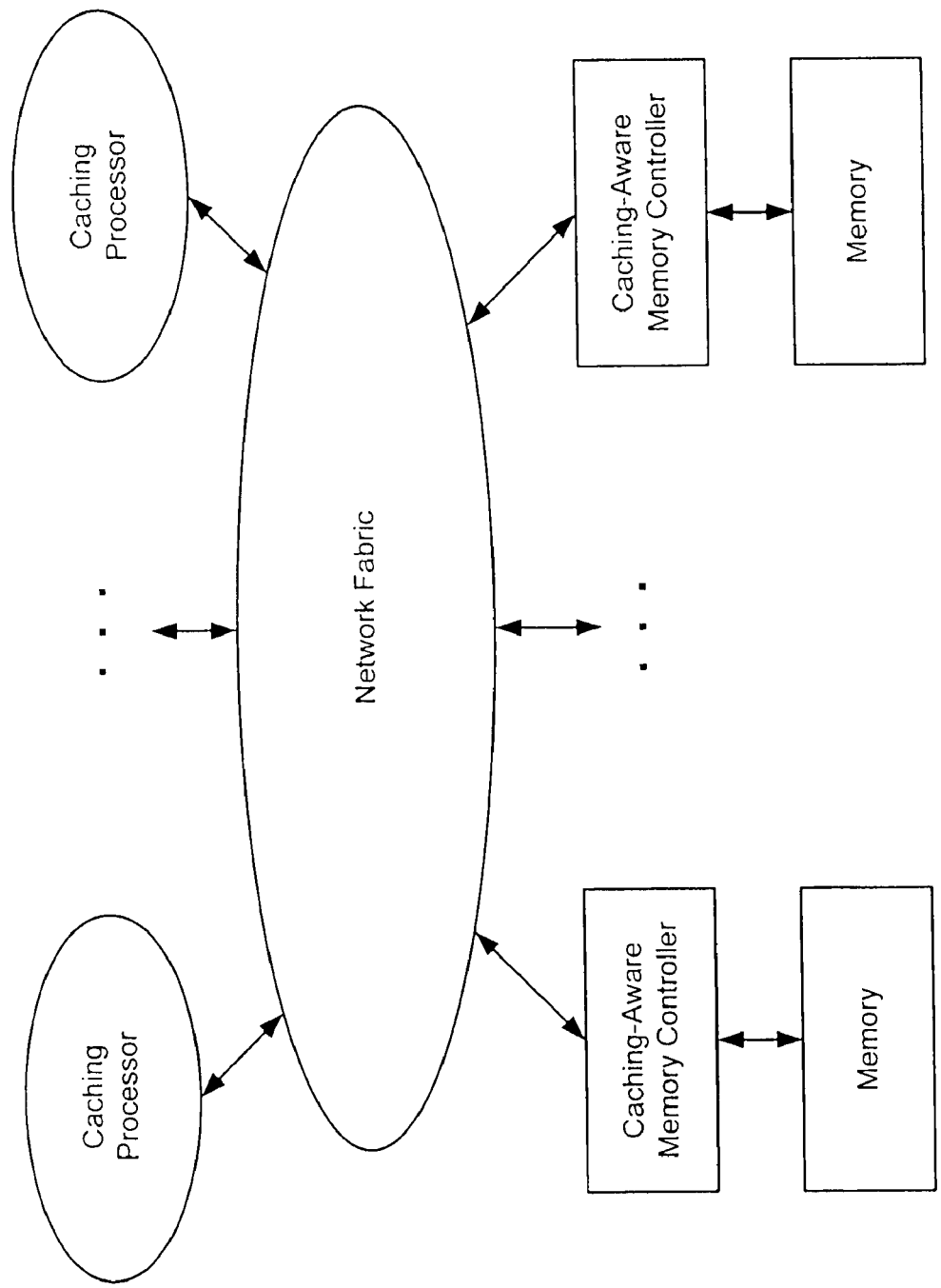
FIG. 2 is a conceptual illustration of one embodiment of a system that may utilize point-to-point interconnects.

FIG. 2 is a conceptual illustration of one embodiment of a system that may utilize point-to-point interconnects. In one embodiment, the system of FIG. 2 may utilize a point-to-point architecture that supports a layered protocol scheme. In one embodiment, the system may include a plurality of caching agents and home agents coupled to a network fabric. For example, the network fabric may adhere to a layered protocol scheme and comprised of: a physical layer, a link layer, a routing layer, a transport layer and a protocol layer (as depicted in connection with FIG. 1). The fabric may facilitate transporting messages from one protocol (home or caching agent) to another protocol for a point-to-point network.

FIG. 2 is a high level, simplified abstraction of a protocol architecture that may utilize one or more point-to-point links. The fabric may facilitate transporting messages from one protocol (caching processor or caching aware memory controller) to another protocol for a point-to-point network. Each caching-aware memory controller may be coupled with memory that may include, for example, dynamic random access memory (DRAM), flash memory, or any other type of memory known in the art.

Figure 3:
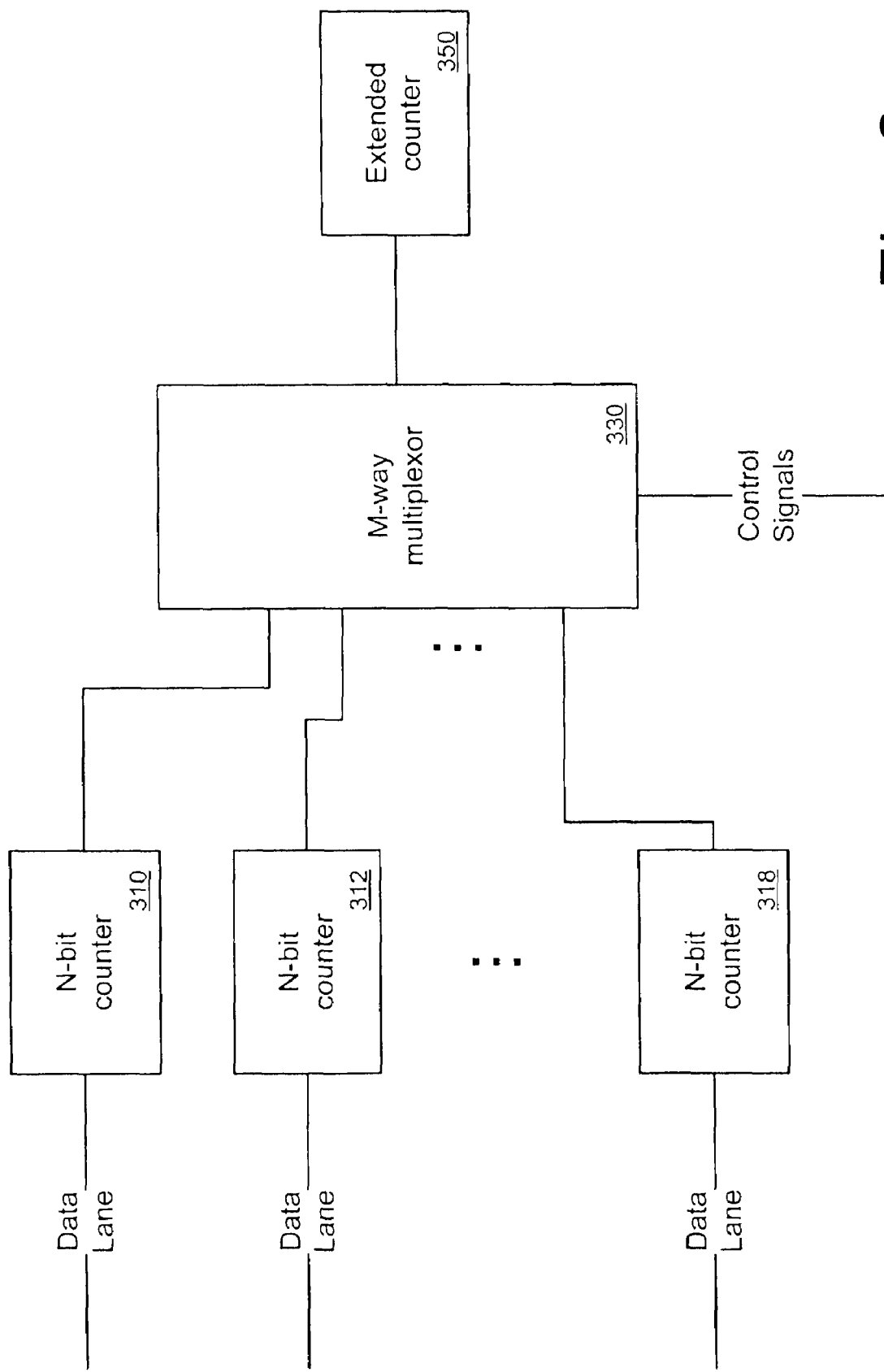
FIG. 3 is a block diagram of one embodiment of a flexible error counting architecture.

FIG. 3 is a block diagram of one embodiment of a flexible error counting architecture. In one embodiment, each data lane corresponds to a serial physical link; however, any data communications medium may be utilized. The configuration of FIG. 3 may be used, for example, to count bit errors that occur during transmission of data over a physical link.

In one embodiment, each data line may be coupled with a N-bit counter (e.g., 310, 312, 318). Any size counter may be used, for example, each counter may be an 8-bit counter. The size of the counter used may be selected based on, for example, the expected error rate for a relatively low end of a frequency, timing and/or voltage stress factors to be used in testing. The N-bit counters may be any size (e.g., 8-bit, 12-bit, 4-bit, 24-bit, 32-bit). Each of the N-bit counters may be coupled with multiplexor 330.

Control signals may be provided to multiplexor 330 by any type of control circuitry. For example, the control signals may be provided by software controlled circuitry that allows a user to determine the configuration of the counters and multiplexor. In another embodiment, the control signals may be provided by firmware to implement a pre-programmed testing sequence.

The output of multiplexor 330 may be coupled with extended counter 350. Extended counter 350 may be any size counter (e.g., 24-bit, 32-bit, 16-bit, 8-bit, 56-bit). For example, if N-bit counters 310, 312, ... 318 are 8-bit counters and extended counter 350 is a 24-bit counter, a selected data lane may have 32 bits of error counting. Thus, a single extended counter may be shared between multiple smaller counters to provide a greater error counting capacity than the N-bit counters alone.

In one embodiment, the error count provided by the combination of the selected N-bit counter and extended counter 350 may be accessible through a debug or testability register. In one embodiment, the following register configuration may be used.

TABLE 1

Register configuration.

| Bits | Width | Name | Default Value | Value/Description |
| --- | --- | --- | --- | --- |
| 31 | 1 | Error Overflow | 0 | If set, indicates that the error counter has been extended to extended counter. Bit cleared upon Loopback. |
| 30:0 | 31 | Lane Error Counter | 0 | Lane Error Counter is the accumulation of errors in a selected lane. Exact number of bits in counter may vary by architecture implementation. Counter cleared upon Loopback. |

The register configuration of Table 1 corresponds to a total counter (N-bit counter plus extended counter) width of 32 bits. In alternate embodiments, other register configurations may be supported. The register may be accessed in any manner known in the art and the value stored in the register may be used in any manner known in the art.

Figure 5:
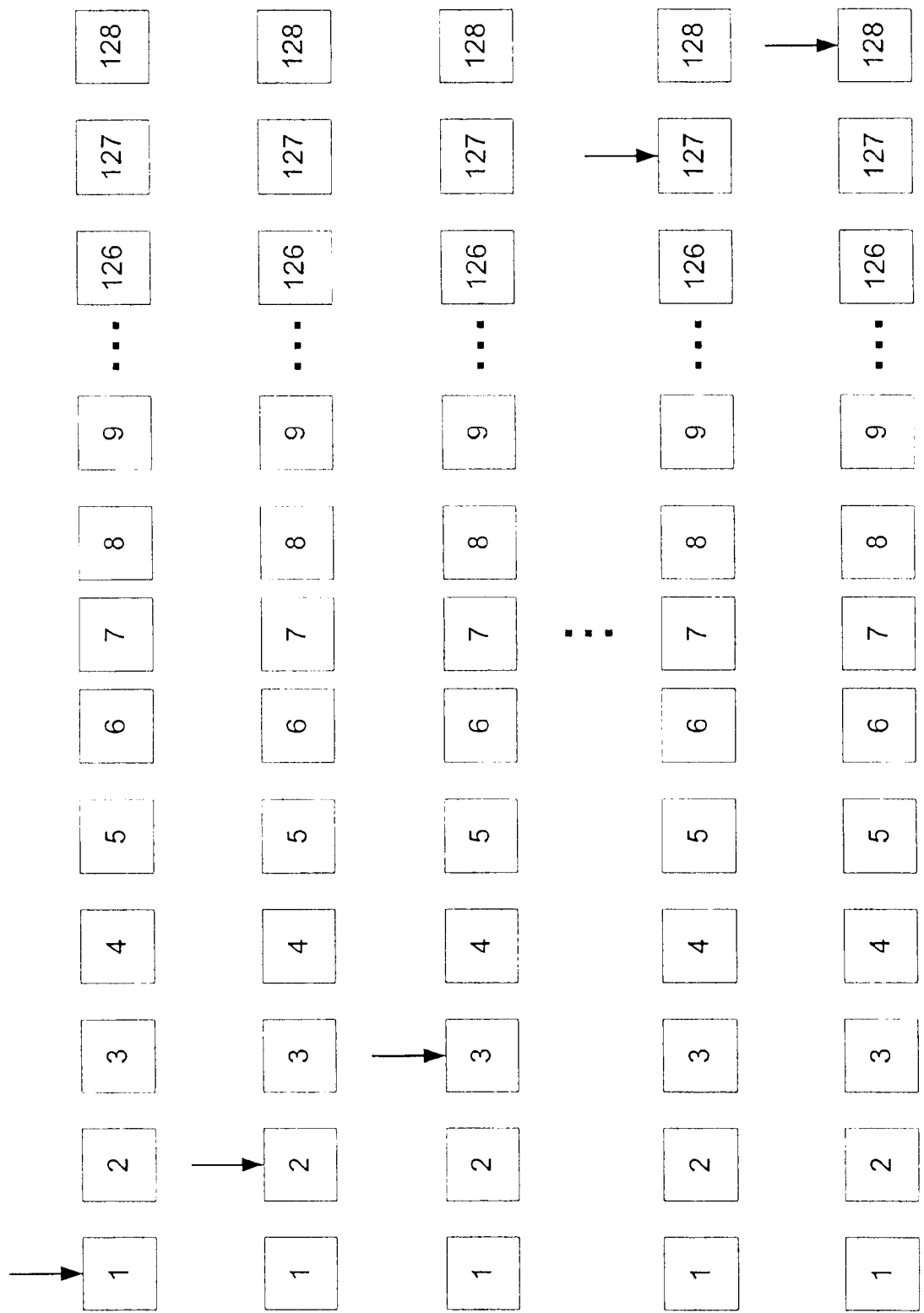
FIG. 5 is a conceptual illustration of error checking using multiple registers for selected bits of an incoming data stream to be stored in respective registers.

In one embodiment, a set of testability registers may be used to support targeted tests and/or on-die oscilloscope functionality. In one embodiment, a register may be utilized to store each bit of an incoming data stream. This is conceptually illustrated in FIG. 4*a*. While FIGS. 4*a*, 4*b* and 5 provide examples of 128 bits, any number of bits my be used.

FIG. 4*b* is a conceptual illustration of error checking using two registers for alternating bits of an incoming data stream to be stored in respective registers. In one embodiment, error checking circuitry may have multiple fields that may be used to selectively program sample and store incoming data bits to various testability registers. By interleaving bits one receiver may sample, for example, the odd bits while a second receiver may sample the even bits.

In one embodiment, a testing instruction and/or a testing register may include fields that correspond to a start of testing and an offset, or interval, that may indicate the sampling interval. In the example of FIG. 4*b*, the first receiver that samples the odd bits may have an offset of "0" and an interval of "2" to indicate that the first bit and every second subsequent bit should be sampled. The second receiver that samples the even bits may have an offset of "1" and an interval of "2" to indicate that the second bit and every second subsequent bit should be sampled. Other offsets and intervals may be used to provide different testing scenarios.

For example, an initial round of testing may be accomplished using a first set of offsets and intervals. This could be, for example, every fourth or every tenth bit. The sampled data may be compared to expected data to determine whether the data appears to be as expected. If so, the test results may be considered satisfactory. If, however, one or more of the bits are not as expected, a different offset and/or interval may be used to provide additional testing information that may be used to debug the underlying system or configuration.

FIG. 5 is a conceptual illustration of error checking using multiple registers for selected bits of an incoming data stream to be stored in respective registers. In one embodiment, each individual bit in a stream of data may be characterized to build an on-die oscilloscope trace. The example of FIG. 5 illustrates a first receiver with offset of "0" and an interval of "128," a second receiver with an offset of "1" and an interval of "128" and so on. In general, the greater the interval the less inter-symbol interference (ISI) experienced.

The individual bits that are captured using the offset and interval parameters may be combined to generate an on-die oscilloscope trace using suitable techniques known in the art. The techniques and architectures described herein may provide improved raw data from which to generate testing data. Another advantage of the techniques described herein is that, using the offset and interval parameters, the testing process may be more efficient because the granularity of the testing data may be tailored to the specific situation.

Figure 6:
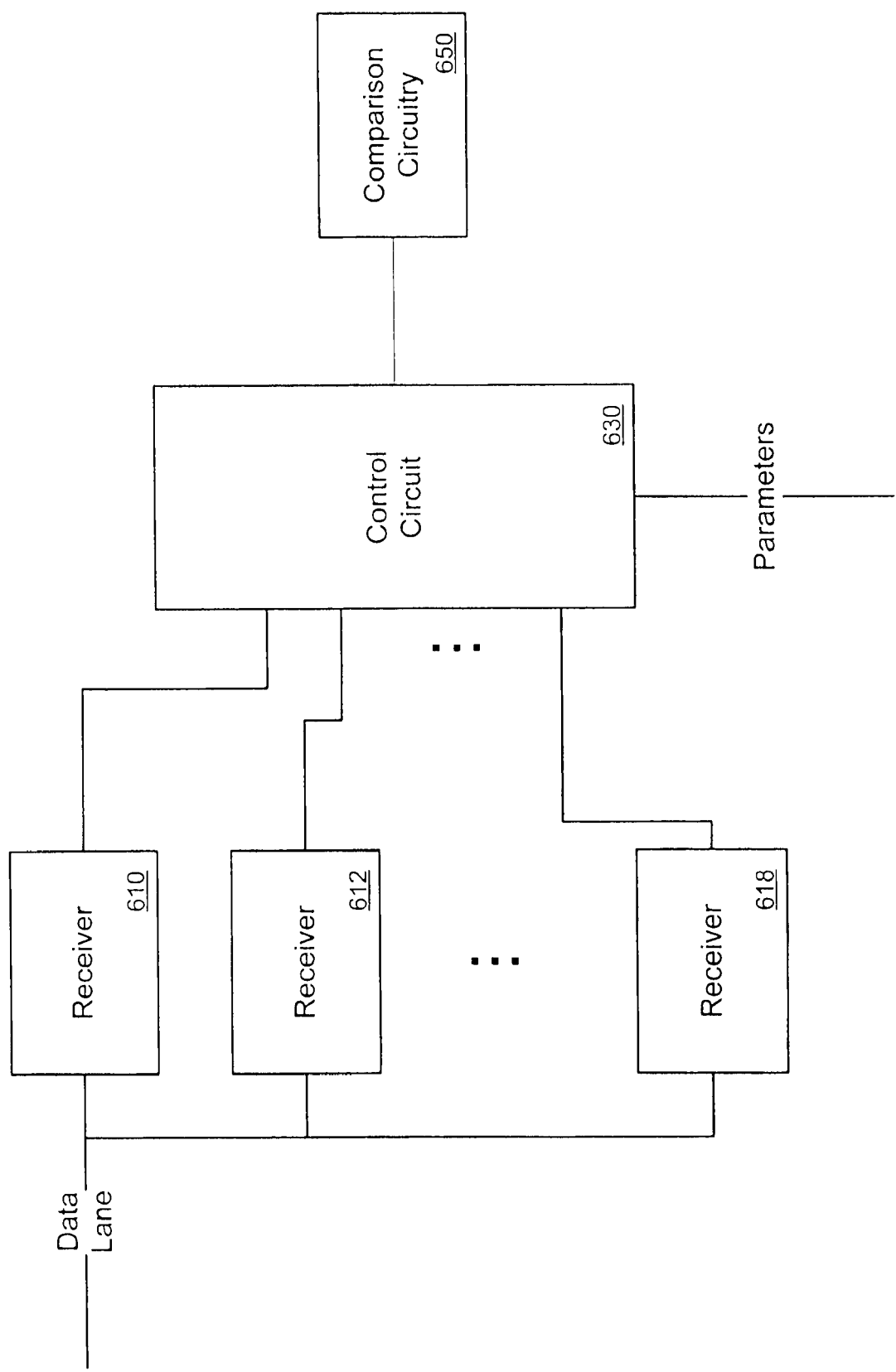
FIG. 6 is a block diagram of one embodiment of circuitry for error checking using selected bits from incoming data streams.

FIG. 6 is a block diagram of one embodiment of circuitry for error checking using selected bits from incoming data streams. Multiple receiver circuits (e.g., 610, 612, 618) may be coupled to receive data via a data lane. The receivers may be coupled with control circuitry 630, which may cause the receivers to selectively sample data according to offset and interval parameters for the respective receivers, as described above. Control circuitry 630 may be coupled to receive the parameters from an external source, for example, one or more debug or testing registers, a software application, etc.

Comparison circuitry 650 may be coupled with control circuitry 630 to compare the sampled data values to expected data values. The sampled data values may be stored, for example, in registers in the respective receivers and/or in registers in control circuitry 630. The sampled data values may be accessed in any manner known in the art.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
   a receiver coupled to receive a data stream via a point-to-point serial link;

a control circuit coupled with the receiver to cause the receiver to selectively sample the data stream according to an offset parameter and an interval parameter; and comparison circuitry to compare the data stream sample to expected data values to determine a bit error rate.

2. The apparatus of claim 1 further comprising a second receiver coupled with the control circuit and with the comparison circuitry, the second receiver coupled to receive the data stream via the point-to-point serial link, the control circuit to cause the second receiver to selectively sample the data stream according to a second offset parameter and a second interval parameter, the comparison circuitry to compare the data stream sample to expected data values to determine a second bit error rate.

3. The apparatus of claim 2 wherein the offset parameter and the interval parameter are retrieved from a testing register.

4. The apparatus of claim 2 wherein the offset parameter and the interval parameter are received in a testing instruction.

5. A system comprising:
a dynamic random access memory (DRAM); and
an end point coupled with the DRAM and to be coupled with a point-to-point serial physical link having a receiver coupled to receive a data stream, a control circuit coupled with the receiver to cause the receiver to selectively sample the data stream according to an offset parameter and an interval parameter, and comparison circuitry to compare the data stream sample to expected data values to determine a bit error rate.

6. The system of claim 5, wherein the end point further comprises a second receiver coupled with the control circuit and with the comparison circuitry, the second receiver coupled to receive the data stream via the point-to-point serial link, the control circuit to cause the second receiver to selectively sample the data stream according to a second offset parameter and a second interval parameter, the comparison circuitry to compare the data stream sample to expected data values to determine a second bit error rate.

7. The system of claim 6 wherein the offset parameter and the interval parameter are retrieved from a testing register.

8. The system of claim 6 wherein the offset parameter and the interval parameter are received in a testing instruction.

9. A method comprising:
selectively sampling a first set of data from a data stream according to a first offset parameter and a first interval parameter;
storing the first set of data in a first register;
selectively sampling a second set of data from the data stream according to a second offset parameter and a second interval parameter;
storing the second set of data in a second register;
comparing the first set of data to a first expected data set;
comparing the second set of data to a second expected data set; and
storing a count of errors based on the comparisons.

10. The method of claim 9 wherein the first register is in a first receiver and the second register is in a second receiver.

11. The method of claim 9 wherein the first register and the second register are both in a control circuit coupled to control sampling of the first set of data and the second set of data.

* * * * *